Nov. 12, 1957
H. REICHARD ET AL
2,812,694
DUPLICATE MILLING MACHINE
Filed April 9, 1954
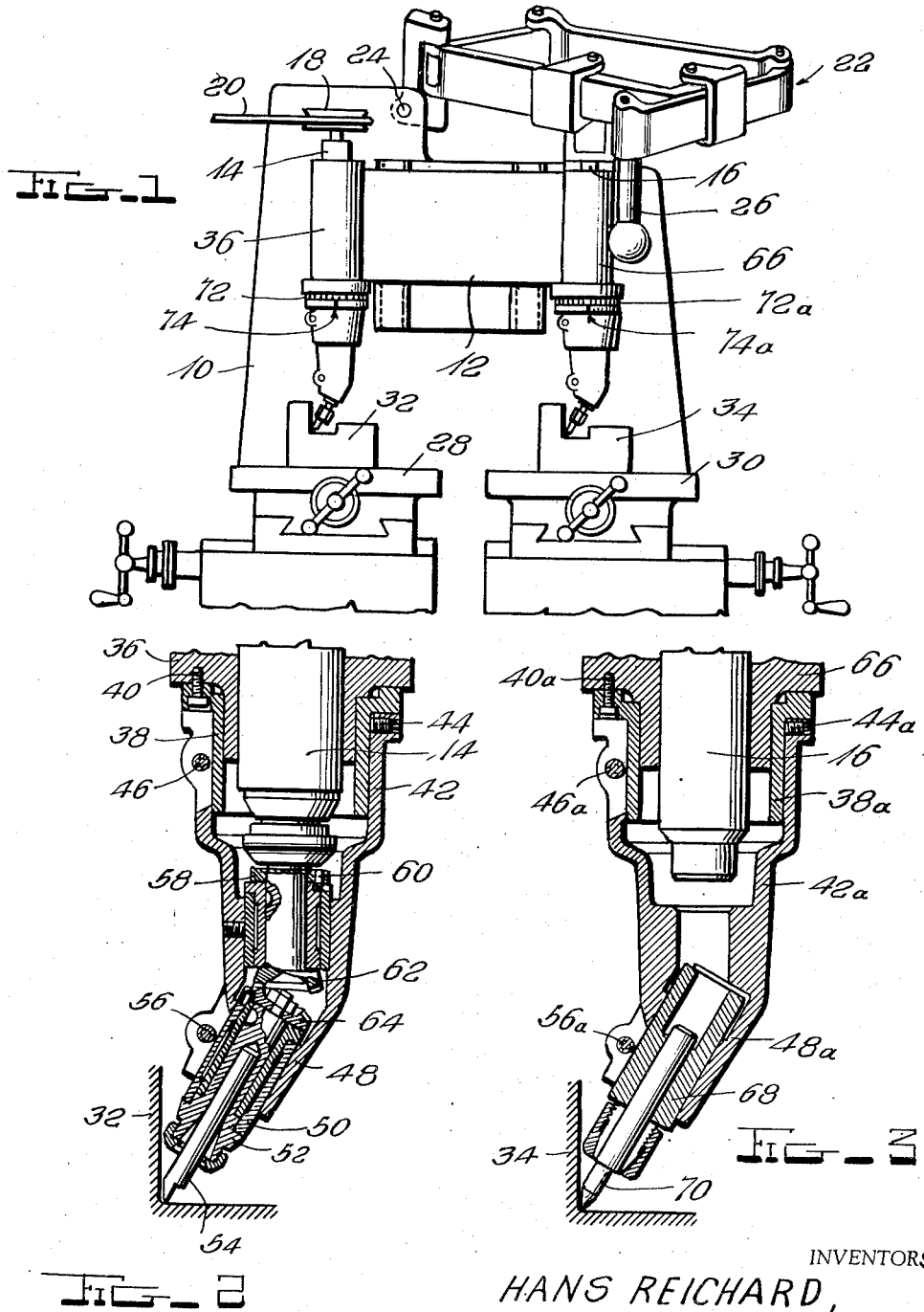
INVENTORS
HANS REICHARD,
WILHELM BAUER,
BY John B. Brady
ATTORNEY

United States Patent Office 2,812,694
Patented Nov. 12, 1957

2,812,694

DUPLICATE MILLING MACHINE

Hans Reichard and Wilhelm Bauer, Nurnberg, Germany, assignors to Hans Deckel, Munich-Solln, Germany, and Friedrich Wilhelm Deckel, Garatshausen, Post Tutzing, Germany Application April 9, 1954, Serial No. 422,073

Claims priority, application Germany April 11, 1953

6 Claims. (Cl. 90—13.1)

The present invention relates to duplicating milling and/or engraving machines of the type in which there are two spindle-like members, one of which carries the milling or engraving tool, while the other carries a tracer member, said members being arranged to be guided in a system of three-directional co-ordinates in such a manner as to always retain the original orientation of said spindle-like members.

The invention has for one of its objects the provision of a duplicating device of the type indicated which, regardless of the dimensions of the cutting tool and/or tracer member, permits satisfactory cutting operations to be performed on sharp edges or corners of workpieces of any desired shape or size, including forming dies and the like having deep die impressions or recesses. According to the invention this object is achieved by arranging the cutting tool and the tracer member with their respective axes inclined at a suitable angle in relation to the spindle-like member with which they are respectively associated.

Further objects and features of the invention will be apparent from the following description of a preferred embodiment in conjunction with the appended drawings in which:

Fig. 1 is a fragmentary front elevation of the duplicating milling machine of the invention;

Fig. 2 is a vertical part-sectional elevation of the cutting tool carrier of the embodiment of Fig. 1; and Fig. 3 is a vertical part-sectional elevation of the tracer member carrier of the embodiment of Fig. 1.

The duplicating or copying machine illustrated in Fig. 1 is of the general type in which there are two spindle-like members, one of which carries a rotary cutting tool, while the other carries a tracer member, said members being arranged to be guided in a three-dimensional system of co-ordinates in such a manner as to always retain the original orientation of said spindle-like members. Since an arrangement of this nature is described and illustrated, for example, in United States Letters Patent No. 2,371,941, issued March 20, 1945, it will be sufficient for the purpose of illustrating the present invention to describe said known arrangement in general outline only. A substantially vertical column 10 supports a vertically arranged beam member 12 in such a manner as to permit universal or three-dimensional movements of the beam member 12 with said member always retaining its original orientation. The said beam member is adapted to receive a cutter spindle 14 and a tracer spindle 16, the axes of both spindles being vertical. The cutter spindle 14 is driven via a pulley 18 and a belt 20 by a drive motor (not shown) incorporated in the machine.

The movements of the beam member 12 and thus also of the spindles 14 and 16, during which movements the original orientation of these parts is retained, is controlled by a pantograph linkage 22 which, while being pivoted at 24 to column 10, is arranged to be guided with the aid of handle 26. The said pantograph linkage is coupled to the beam member 12 via the tracer spindle 16.

Two tables 28 and 30 are also provided on column 10 both of which are arranged for crosswise and endwise movement, one of said tables supporting a workpiece 32, the other carrying the master or pattern 34. In order to permit sharp-angled corners and edges to be satisfactorily traced on the master or pattern and to be accurately reproduced on the workpiece, the invention, as has been heretofore mentioned, provides for the axes of the cutting tool and the tracer member to be inclined in relation to the spindles with which the tool and tracer member are respectively associated. Details of this arrangement are illustrated in Figs. 2 and 3.

Referring to Fig. 2, a sleeve member 38 is flanged by means of a plurality of screws 40 to the housing 36 of the cutter spindle 14. The said sleeve member 38 is surrounded with a bracket member 42 which is axially positioned by a set screw 44 and clamped onto the sleeve 38 by a transverse clamping bolt 46. The lower portion of the bracket 42 is formed as a substantially tubular housing 48 whose axis is inclined at a suitable angle in relation to the axis of the cutter spindle 14, a transverse clamping bolt 56 serving to clamp in position within said tubular housing 48 a bearing sleeve 50 adapted to receive a spring collet 52 serving to grip a suitable cutting tool such as a single-lip milling cutter 54. The cutting tool 54 is driven for rotation from the spindle 14 by way of coupling means arranged within the tubular housing 48 and the bracket member 42. The said coupling means comprise a driving disc 58 inserted into the lower end of spindle 14, the said driving disc having a drive pin 60 adapted to transmit rotary motion to a pair of bevel gears 62, 64 of which the bevel gear 64 is drivingly connected with the spring collet 52.

In similarity to the arrangement of the bracket member 42 supporting the cutting tool 54, the housing 66 accommodates the tracer spindle 16 and supports the bracket member 42a which is held in position by the members 38a, 40a, 44a and 46a. In the case of the arrangement now under consideration, however, a transverse bolt 56a serves to clamp in position within the inclined portion 48a of bracket member 42a, a spring collet 68 adapted to grip a tracing stylus 70.

The tubular housing portions 48 and 48a are inclined at the same angle and in the same direction so that both the cutting tool 54 and the tracing stylus 70 are also inclined at the same angle in relation to the parallel spindles 14 and 16, respectively. In order to ensure the same orientation of the tubular housing portions 48 and 48a, graduations 72 and 72a are provided on the sleeves 38 and 38a, said graduations co-operating with index marks 74 and 74a respectively provided on the tubular housings 42 and 42a. The inclined position, according to the invention, of the tracing stylus 70 makes it possible to trace on the master 34 any sharp edge or corner in a vertical as well as in a horizontal direction. Along similar lines, the inclined position of the cutting tool 54 in relation to its associated spindle 14 permits such sharp-angled edges or corners to be accurately reproduced on the workpiece 32, the shank diameter of the cutting tool, the tracing stylus and the respectively associated spindles being of no consequence in this respect.

It will be appreciated that the arrangement, according to the invention, of the cutting tool and the tracing stylus, while permitting duplicating operations at a 1:1 ratio to be performed, also enables reducing and enlarging work to be carried out, the tracing stylus and its associated spindle 16 in the latter case not being inserted into the beam member 12 but directly into the pantograph linkage so as to provide for a pantograph-controlled tracing stylus in a manner similar to that described in the heretofore mentioned United States Letters Patent.

While we have described one of the preferred embodiments of our invention we realize that modifications may be made and we desire that it is understood that no limitations upon our invention are intended other than may be imposed by the scope of the appended claims.

What we claim and desire to secure by Letters Patent of the United States is:

1. A duplicating milling or engraving machine of the type having a frame, a linkage system provided on said frame and supporting at least two spindles, and means for displacing said linkage system in three coordinate directions relatively to said frame, the first spindle being rotatory driven from a source of driving power and carrying a rotatory machining tool cooperating with a work-piece, the second spindle carrying a tracing stylus cooperating with a pattern, the axes of said machining tool and said tracing stylus being inclined in relation to the axes of the spindles on said linkage system.

2. A duplicating milling or engraving machine as set forth in claim 1 which includes a first bearing sleeve carried by the linkage system for receiving the first spindle, a first mounting member attachable to said first bearing sleeve and surrounding the end of said first spindle, and an inclined portion of said first mounting member adapted to receive the rotatory machining tool.

3. A duplicating milling or engraving machine as set forth in claim 1 which includes a first bearing sleeve carried by the linkage system for receiving the first spindle, a first mounting member attachable to said first bearing sleeve and surrounding the end of said first spindle, and a coupling means in said first mounting member, said coupling means engaging the rotatory machining tool and the first spindle thus driving said tool from said first spindle.

4. A duplicating milling or engraving machine as set forth in claim 1 which includes a first bearing sleeve carried by the linkage system for receiving the first spindle, a first mounting member attachable to said first bearing sleeve and surrounding the end of said first spindle, and a coupling means in said first mounting member, said coupling means engaging the rotatory machining tool and the first spindle thus driving said tool from said first spindle, graduation and index means on said first bearing sleeve and said first mounting member respectively for adjusting said first mounting member in a selected position, clamping means carried by said first mounting member for clamping said first mounting member in its selected position, and an inclined portion on said first mounting member for receiving the rotatory machining tool.

5. A duplicating milling or engraving machine as set forth in claim 1 which also includes a second bearing sleeve carried by the linkage system for receiving the second spindle, a second mounting member attachable to said second bearing sleeve and surrounding the end of said second spindle, and an inclined portion on said second mounting member for receiving the tracing stylus.

6. A duplicating milling or engraving machine as set forth in claim 1, which also includes a second bearing sleeve carried by the linkage system for receiving the second spindle, a second mounting member attachable to said second bearing sleeve and surrounding the end of said second spindle, graduation and index means on said second bearing sleeve and said second mounting member respectively for adjusting said second mounting member in a selected position, clamping means carried by said second mounting member for clamping said second mounting member in its selected position, and an inclined portion on said second mounting member for receiving the tracing stylus.

References Cited in the file of this patent

UNITED STATES PATENTS

| | | |
|---|---|---|
| 1,166,126 | Gridley | Dec. 28, 1915 |
| 2,250,241 | Thalmann | July 22, 1941 |
| 2,260,157 | Zwick | Oct. 21, 1941 |
| 2,645,967 | Von Zelewsky | July 21, 1953 |
| 2,728,268 | Clifton et al. | Dec. 27, 1955 |